Patented Oct. 5, 1937

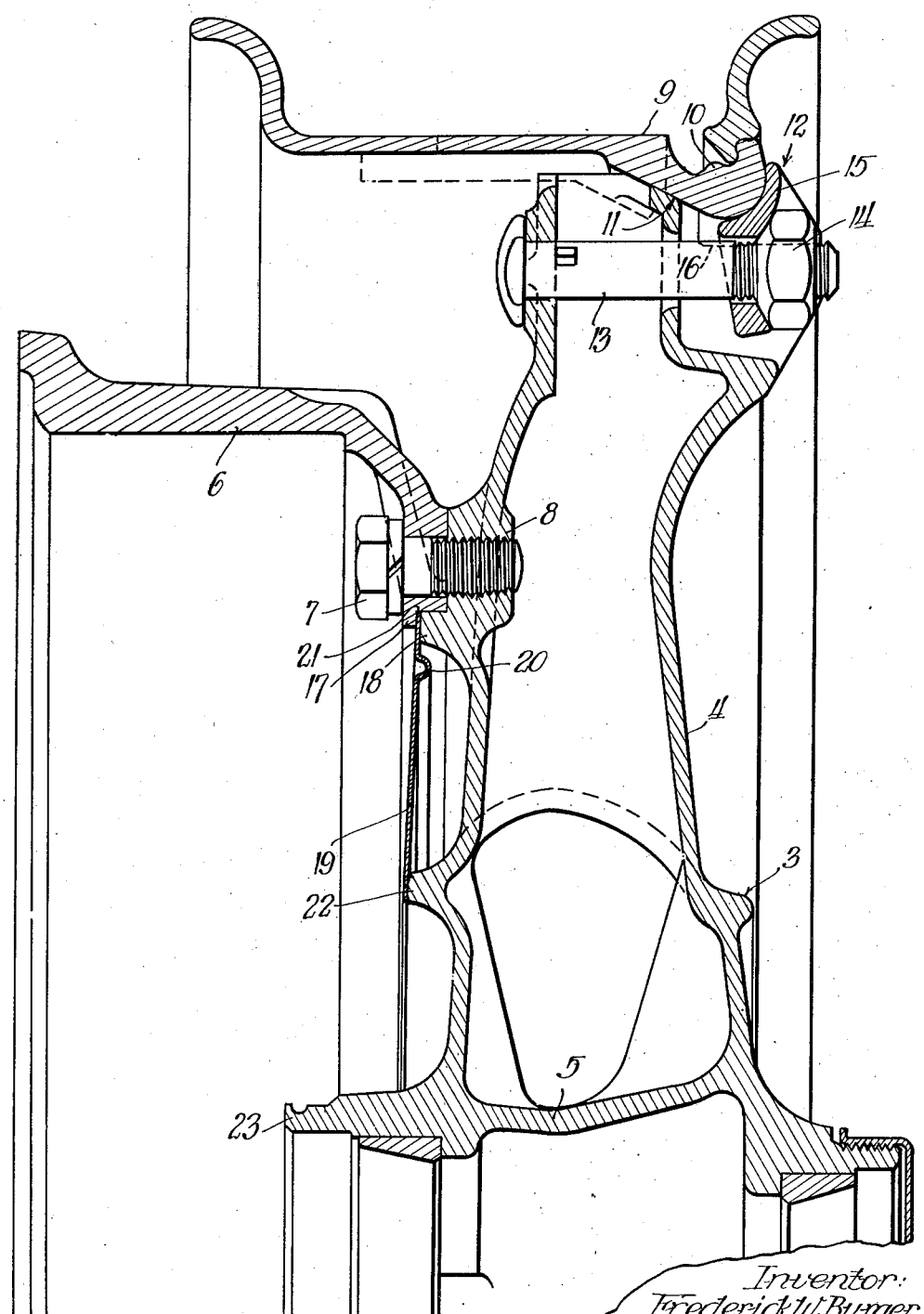

2,094,637

UNITED STATES PATENT OFFICE 2,094,637

WHEEL

Frederick W. Burger, Niles, Mich., assignor to Clark Equipment Company, Buchanan, Mich., a corporation of Michigan Application April 2, 1936, Serial No. 72,329

10 Claims. (Cl. 301—6)

The present invention relates to wheels and more particularly to a novel brake closure plate and wheel assembly, with an improved construction for mounting the plate upon the wheel.

In prior wheel assemblies of this type the outer periphery of the brake closure plate extended into a groove formed between the inwardly extending flange of the brake drum and the wheel spider and was centered by the bolt means that secured the drum and spider together. In this type of assembly the brake plate was provided with a circumferential series of holes or slots receiving the bolt means at the inboard side of each spoke. In the present invention, I form the brake closure plate in such manner that its outer periphery extends into a groove formed between the drum and spider radially inwardly of the point where the bolt means passes through in securing the drum and spider. By slightly extending the flange on the head of the brake drum, I obtain substantially as effective a grip as secured in prior wheel assemblies, and in addition provide a wheel and drum that is assembled more easily and does not require as much metal in the brake closure plate.

In the present invention, I provide the brake closure plate with an annular rib portion disposed at a point spaced radially inwardly of the outer peripheral edge thereof. The function of this rib is to provide flexure of the brake closure plate to allow it to readily adjust itself into clamped position.

The brake plate extends radially inwardly to a point where the individual spokes merge into the hub of the wheel spider. At its inner edge the plate is engaged on its radial surface by an annular flange projecting laterally inwardly from the hub portion of the wheel spider. This flange extends laterally inwardly to a point beyond the plane of the meeting surfaces of the drum and spider bolt means which clamps the outer peripheral edge of the brake plate in position, thus causing the brake plate to flex uniformly to hold the plate tightly against the wheel spider. In addition, the annular groove depressions made in the brake plate enhances the appearance of the wheel.

It is a primary object of the present invention to provide a brake closure plate that may be readily and simply mounted upon or dismounted from the remainder of the wheel assembly.

Another object is the provision of a novel brake closure plate that can be securely held in position by clamping engagement in a groove formed between the drum and spider, with the inner peripheral edge of the plate engaging a projecting annular seat formed on the wheel spider.

A still further object is the provision of a wheel spider provided with a laterally inwardly projecting abutment adapted to shackle the brake closure plate in fixed and non-rattling position upon the wheel assembly independently of engagement of the plate by bolts or the like.

One of the main advantages of the present construction resides in the manner of substantially completely enclosing the inboard side of the wheel with a brake closure plate that need not be centered on bolts or other like securing means.

These and other objects and advantages of the invention will be apparent to those skilled in the art from the following detailed description of the present invention taken in conjunction with the accompanying drawing illustrating the preferred embodiment of my invention.

The single figure is a cross-sectional view through the hub and one spoke of a wheel assembly embodying the present invention.

While I have shown in the drawing my invention incorporated with one type of wheel assembly, it is to be understood that this is for purposes of illustration only, and it is believed that a description of this embodiment will be sufficient to disclose to those skilled in the art the preferred construction and operation of the present invention.

Referring now in detail to the drawing, I provide a wheel spider 3 having a plurality of radially extending hollow spokes 4 merging at their inner ends into the hub 5.

A brake drum 6, which may be of any desired construction and which is provided with a radially inwardly extending flange at the head end thereof, is secured to the rear face of the spokes 4 by means of a plurality of threaded studs 7 engaging in the threaded bosses 8 formed at the inboard side of each of the spokes. The bosses 8 are provided with radially extending faces forming lateral abutments for the flange of the brake drum and are also provided with axially extending shoulder portions 18 which serve to center the drum with respect to the hub 5 of the spider.

The spokes 4 extend radially outwardly from the hub and their outer ends are adapted to receive the rim 9 which may be of the bevel edge type having a gutter portion 10. This inwardly extending tapered surface of the rim 9 is adapted to engage an axially extending tapered rim-receiving seat 11 formed at the outer ends of each of the spokes 4. The rim is wedged into position against the seats 11 by means of a clamping lug 12 movable axially inwardly of the wheel body on the clamping bolt 13 which extends laterally through each spoke end. The projecting end of the bolt 13 receives the nut 14 which engages a suitably rounded seating surface in the outer face of the lug 12 to force the lug inwardly of the bolt 13. The lug 12 is provided with an arcuately curved radially extending portion 15 which engages the lateral surface of the gutter portion 10 of the rim to move the same axially inwardly on the seat 11. The lug is provided with laterally spaced seating shoulders which engage the axially extending shoulders 16 defining a substantially semi-cylindrical socket in which the shank of the lug 12 is received. This construction corresponds generally to that shown in my copending application, Serial No. 579,405, filed December 7, 1931, and need not be described in further detail.

Referring again to the mounting of the brake drum on the boss portion 8 of the spokes 4, it will be noted that the flange of the drum is provided with a radially inwardly extending shoulder portion 17 which is slightly spaced from the shoulder 18 of the spoke to define therebetween a radially extending groove 21 which is adapted to receive the outer peripheral edge of the brake closure plate 19. It will be noted that this groove 21 is disposed within the circumference described by the circle of bolts 13 and that the outer peripheral edge of the plate 19 is held in position solely by the clamping pressure between the brake drum and the wheel spider. Consequently the brake closure plate 19 is held in position without the necessity of being centered on the bolts 7.

Such a construction necessarily results in the provision of a plate member of small size and eliminates the punching operations formerly necessary to form the bolt openings by which the plate was clamped in position. Further, this present construction also facilitates rapid assembling of the plate in position.

The plate 19 is provided with an annular outwardly bowed rib portion 20 disposed adjacent its outer peripheral edge but radially inwardly of the shoulders 18 of the spokes. This rib 20 assists in flexing of the plate 19 when its outer peripheral edge has been clamped in position and accommodates such flexing action without producing any noticeable distortion of the plate.

Each of the spokes on the inboard side thereof is provided with an axially inwardly extending shoulder 22 disposed radially intermediate the hub 5 and the shoulders 18, and preferably disposed radially inwardly of the point at which the spokes merge into the hub to form an annular flange. The shoulder 22 terminates in a plane spaced axially inwardly of the groove 21. The radial surface of the plate 19 adjacent its inner peripheral edge is adapted to be engaged by the shoulders 21 to flex the radial inner portion of the plate inwardly as shown in the drawing. This serves to hold the plate in fixed non-rattling position, since the inherent resiliency of the plate holds its inner peripheral edge in tight abutting engagement with the face of the shoulder 22.

It will thus be apparent that the plate is held in position only by the frictional clamping engagement at its outer periphery and the shackling action produced by forcing its inner periphery out of planar alignment with respect to the groove 21.

It is believed obvious that the inner peripheral edge of the plate 19 might be extended inwardly and into close proximity to the oil slinger shoulder 23 of the hub 5 in situations in which a complete closure of the brake drum on the outboard side thereof is desired. However, since the inner periphery of the plate 19, shown in the drawing, is disposed radially inwardly of the point at which the spokes merge into the hub of the wheel, it is obvious that the plate 19 in the illustrated embodiment of the invention serves as a complete closure for the outboard side of the brake drum.

I am aware that various changes and modifications in details of the wheel assembly and the manner of attaching the drum to the spider are possible without departing from the underlying teachings of the present invention, and I therefore do not intend to be limited except as defined by the scope and spirit of the appended claims.

I claim:

1. In combination, in a wheel assembly, a wheel spider, a brake drum having an inwardly extending flange, bolt means securing the flange of said drum to said spider, a brake closure plate secured to said assembly and having its outer peripheral edge clamped between said flange and said spider radially inwardly of said bolt means, an axial flange on said spider radially inwardly of said drum flange, said plate engaging the radial inner face of said axial flange.

2. In combination, in a wheel assembly, a wheel spider having a plurality of spokes, a brake drum, a brake closure plate adapted to have its outer peripheral edge relatively freely disposed in a groove formed between a portion of said spider and said drum, means for clamping said drum and said wheel spider together, said spider being provided with an axially inwardly extending abutment disposed radially inwardly of said drum for engaging the surface of said brake plate adjacent its inner periphery.

3. In a wheel assembly, the combination of a wheel spider having spokes, a brake drum, a brake closure plate comprising an annular disc, a groove formed between said brake drum and a portion of said spider at each spoke for receiving the outer peripheral edge of said brake plate, said brake plate having an annular rib formed therein radially inwardly of said edge, an axially inwardly extending seat formed upon said spider for engaging the surface of said brake plate adjacent its inner periphery and for causing said plate to flex at said rib to maintain said plate in fixed shackled position.

4. In a wheel assembly, the combination of a wheel spider having a plurality of spokes, a brake closure plate, a brake drum secured to the inboard side of said spider, a radially inwardly opening annular groove formed between said spider and said drum radially inwardly of the point of attachment of said drum to said spider for receiving the outer peripheral edge of said brake closure plate, a seat formed on said spider and extending axially inwardly beyond the radial plane of said groove for engaging said plate radially inwardly of said groove, for dishing said plate axially away from said spider, said brake plate having means facilitating said dishing.

5. The combination of claim 4 wherein the brake closure plate and the portion of said wheel spider disposed radially inwardly of said seat completely close the head side of the brake drum.

6. In a wheel assembly, the combination of a wheel spider having radially extending spokes, a brake drum, an annular brake closure plate, means securing said drum to said spider, a groove formed between said drum and the spoke portions of said spider radially inwardly of said securing means and adapted to receive the outer peripheral edge of said brake plate therebetween, a seat formed at the inner ends of said spokes and extending axially inwardly of the radial plane of said groove, said seat being engaged by the inner peripheral portion of said brake plate and maintaining said brake plate in fixed non-rotating position on said wheel assembly.

7. The combination with a hollow spoke wheel spider and brake drum assembly, of a brake closure plate comprising a disc-like member having an outer circular periphery of a radius less than the bolt circle radius of said assembly, and having an inner circular peripheral edge of a radius greater than the hub of the wheel spider and less than the radius at which the spokes of said spider merge together.

8. In a wheel, a wheel spider, a brake drum bolted thereto at a plurality of circumferentially spaced points, and a closure plate frictionally clamped between said drum and spider radially inwardly of said points and adapted to have its inner periphery flexed axially inwardly of the plane defined by its attachment between said drum and spider.

9. In combination, in a wheel assembly, a wheel spider having a plurality of spokes, a brake drum having a radially inwardly projecting flange forming radial and axial seating surfaces, a boss on the inboard side of each spoke having cooperating radial and axial seating surfaces receiving said drum flange surfaces, bolt means securing said drum flange to said bosses, radially directed surfaces on said flange and bosses disposed radially inwardly of said seating surfaces and spaced to define grooves therebetween when said drum is mounted in position, and a brake closure plate having its peripheral edge frictionally engaged in said grooves.

10. The combination, with a wheel assembly including a wheel spider having a plurality of spokes, bosses on the inboard sides of the spokes having axial seating surfaces terminating in coplanar radially extending seating surfaces, and a brake closure plate of a diameter substantially equal to the diameter of said axial seating surfaces, of a brake drum having a radially inwardly directed flange provided with a radial surface terminating at its inner end in an annular cylindrical surface centered on said axial seating surfaces of said bosses, and a radially inwardly directed lip on one edge of said cylindrical surface adapted to clamp the peripheral edge of said plate against the bosses radially inwardly of said seating surfaces when the drum flange is secured to said bosses.

FREDERICK W. BURGER.